United States Patent
Shi et al.

(10) Patent No.: US 11,271,717 B2
(45) Date of Patent: Mar. 8, 2022

(54) BLOCKCHAIN CONSENSUS METHODS AND SYSTEMS

(71) Applicant: Thunder Token Inc., Sunnyvale, CA (US)

(72) Inventors: Runting Shi, Sunnyvale, CA (US); Rafael Pass, Sunnyvale, CA (US); Yue Guo, Sunnyvale, CA (US)

(73) Assignee: Thunder Token Inc., Sunnyvale, CA (US)

( * ) Notice: Subject to any disclaimer, the term of this patent is extended or adjusted under 35 U.S.C. 154(b) by 358 days.

(21) Appl. No.: 16/280,944

(22) Filed: Feb. 20, 2019

(65) Prior Publication Data

US 2019/0260574 A1    Aug. 22, 2019

Related U.S. Application Data

(60) Provisional application No. 62/633,466, filed on Feb. 21, 2018.

(51) Int. Cl.
*H04L 9/06* (2006.01)
*H04L 9/32* (2006.01)
(Continued)

(52) U.S. Cl.
CPC ............ *H04L 9/0637* (2013.01); *H04L 9/321* (2013.01); *H04L 9/3239* (2013.01);
(Continued)

(58) Field of Classification Search
CPC .................................................. H04L 9/0637
See application file for complete search history.

(56) References Cited

U.S. PATENT DOCUMENTS 9,875,510 B1    1/2018  Kasper
10,195,513 B2   2/2019  Tran et al.
(Continued)

FOREIGN PATENT DOCUMENTS

CN          108182635        6/2018
WO      WO 2019/021105      1/2019

OTHER PUBLICATIONS

Lightning Network, Scalable, Instant Bitcoin/Blockchain Transactions, Feb. 22, 2019, 3 pages https://lightning.network/.
(Continued)

*Primary Examiner* — Simon P Kanaan
(74) *Attorney, Agent, or Firm* — Fox Rothschild LLP (57) ABSTRACT

The present invention is direct a two-mode blockchain consensus protocol and a system implementing such a protocol. The system includes a plurality of node computers (and a communications network connecting the plurality of node computers. The plurality of node computers includes a first node computer, a collecting node computer, a committee of node computers, and one or more node computers that operate based on proof of work algorithms. Each node computer in the plurality includes a blockchain consensus software application running on the processor of the node computer. The blockchain consensus software application is adapted to connect to the plurality of node computers that are connected to the communications network. The blockchain consensus software application implements the two-mode blockchain consensus protocol. Through the software application, the plurality of node computers operate to reach a consensus on adding data to a public ledger.

15 Claims, 3 Drawing Sheets

(51) Int. Cl.
*H04L 29/06* (2006.01)
*H04L 67/104* (2022.01)
(52) U.S. Cl.
CPC ............ *H04L 9/3247* (2013.01); *H04L 63/00* (2013.01); *H04L 63/12* (2013.01); *H04L 67/104* (2013.01); *H04L 2209/38* (2013.01); *H04L 2209/56* (2013.01)

(56) References Cited

U.S. PATENT DOCUMENTS

| | | |
|---|---|---|
| 2015/0170112 A1 | 6/2015 | DeCastro |
| 2015/0332283 A1 | 11/2015 | Witchey |
| 2016/0283920 A1 | 9/2016 | Fisher et al. |
| 2016/0335533 A1 | 11/2016 | Davis et al. |
| 2017/0075941 A1 | 3/2017 | Finlow-Bates |
| 2017/0236120 A1 | 8/2017 | Herlihy et al. |
| 2017/0337534 A1 | 11/2017 | Goeringer et al. |
| 2017/0338963 A1 | 11/2017 | Berg |
| 2017/0345011 A1 | 11/2017 | Salami et al. |
| 2017/0352012 A1 | 12/2017 | Hearn et al. |
| 2017/0352027 A1 | 12/2017 | Zhang et al. |
| 2018/0101560 A1 | 4/2018 | Christidis et al. |
| 2018/0374173 A1 | 12/2018 | Chen et al. |
| 2019/0044734 A1 | 2/2019 | Lancashire et al. |
| 2019/0156440 A1* | 5/2019 | Wang .................... G06Q 10/02 |

OTHER PUBLICATIONS

Raiden Network, Fast, Cheap, Scalable Token Transfers for Ethereum, Feb. 22, 2019, 20 pages https://raiden.network/.
"About Zilliqa, Zilliqa is a scalable, secure public blockchain platform", Feb. 22, 2019,10 pages https://www.zilliqa.com/.
IOTA, "What is IOTA? An Open Source Distributed Ledger", Feb. 22, 2019, 5 pages http://iota.org/.
Timo Hanke, "DFINITY Technology Overview Series Consensus System", Rev. , Jan. 23, 2018,16 pages.
Ittai Abraham et al., "Revisiting Fast Practical Byzantine Fault Tolerance", Dec. 4, 2017, 13 pages https://arxiv.org/pdf/1712.01367.pdf.
Vitalik Buterin, "Minimal Slashing Conditions—Vitalik Buterin—Medium," Mar. 2, 2017, 19 pages https://medium.com/@VitalikButerin/ minimal-slashing-conditions-20f0b500fc6c.
Vitalik Buterin and Vlad Zamfir, Introducing Casper "the Friendly Ghost", Aug. 1, 2015, 9 pages https://blog.ethereum.org/2015/08/01/ introducing-casper-friendly-ghost/.
Miguel Castro and Barbara Liskov, "Practical Byzantine Fault, ToleraNCE", Appears in the Proceedings of the Third Symposium on Operating Systems Design and Implementation, OSDI, Feb. 1999, 14 pages.
Phil Daian, Rafael Pass, and Elaine Shi, Snow White: Robustly Reconfigurable Consensus and Applications to Provably Secure Proofs of Stake, Cryptology ePrint Archive, Report 2016, 64 pages.
Stefan Dziembowski, Lisa Eckey, Sebastian Faust, and Daniel Malinowski. Perun: "Virtual Payment Hubs Over Cryptocurrencies" IACR Cryptology ePrint Archive, 2017:635, 2017, 19 pages.
Ittay Eyal and Emin Gun Sirer, "Majority is not Enough:Bitcoin Mining is Vulnerable", In FC,Nov. 1, 2013, 18 pages https://www.cs.cornell.edu/~ie53/publications/btcProcFC.pdf.
Pedro Fonseca, Kaiyuan Zhang, Xi Wang, and Arvind Krishnamurthy, "An Empirical Study on the Correctness of Formally Verified Distributed Systems", In Proceedings of the Twelfth European Conference on Computer Systems, EuroSys pp. 328-343, New York, NY, USA, 2017. ACM , Apr. 23, 2017.
Silvio Micali, Jing Chen. "Algorand", The Efficient and Democratic Ledger, https://arxiv.org/abs/1607.01341, 2016, 75 pages.
Andrew Miller, Iddo Bentov, Ranjit Kumaresan, and Patrick McCorry, "Sprites and State Channels: Payment Network That Go Faster Than Llightning", CoRR, abs/1702.05812, Nov. 30, 2017, 24 pages.
Andrew Miller, Yu Xia, Kyie Croman, Elaine Shi, and Dawn Song, "The Honey Badger of BFT Protocols", In Proceedings of the 2016 ACM SIGSAC Conference on Computer and Communications Security, CCS '16, pp. 31-42, New York, NY, USA, Feb. 24, 2016. https://eprint.iacr.org/2016/199, https//github.com/amiller/HoneyBadgerBFT.
Rafael Pass, Lior Seeman, and Abhi Shelat, "Analysis of the Blockchain Protocoi in Asynchronous Networks". In Eurocrypt, 2017, Sep. 13, 2016, 39 pages.
Rafael Pass and Elaine Shi, "Thunderella: Blockchains with Optimistic Instant Confirmation", Sep. 19, 2017, 68 pages https://eprint.iacr.org/2017/913.
Rafael Pass and Elaine Shi, "Fruitchains: A Fair Blockchain". In PODC, May 5, 2017, 26 pages.
Rafael Pass and Elaine Shi, "Hybrid consensus: Efficient Consensus in the Permissionless Model". In DISC, 2017, 55 pages , http://www.inite3.org.
Rafael Pass and Elaine Shi, "Rethinking Large-Scale Consensus" (invited paper). In CSF, 2017, 29 pages.
Rafael Pass and Elaine Shi, "The Sleepy Model of Consensus" In Asiacrypt, May 11, 2017, 55 pages.
Joseph Poon and Vitalik Buterin, "Plasma: Scalable Autonomous Smart Contracts", Aug. 11, 2017, 47 pages https://plasma.io/.
Yonatan Sompolinsky, Yoad Lewenberg, and Aviv Zohar, "SPECTRE: A Fast and Scalable Cryptocurrency Protocol", IACR Cryptology ePrint Archive, 2016:1159, 2016, 71 pages.
James Ray, Sharting FAQs "On Sharding Blockchains", Feb. 22, 2019, 39 pageshttps://github.com/ethereum/wiki/wiki/Sharding-FAQ.
Cynthia Dwork, Nancy Lynch, and Larry Stockmeyer, "Consensus in the Presence of Partial Synchrony", Journal of the Association for Computing Machinery. Vol. 35, No. 2, Apr. 1988, pp. 288-323.
E. Kokoris-Kogias, P. Jovanovic, L. Gasser, N. Gailly, E. Syta, and B. Ford, "Omniledger: A Secure, Scale-Out, Decentralized Ledger via Sharding", In 2018 IEEE Symposium on Security and Privacy (SP), vol. 00, 16 pages, May 20, 2018.
Jae Kwon, "Tendermint: Consensus Without Mining", Draft v.0. 6,11 pages. http://tendermint.com/docs/tendermint.pdf, May 2014.
Dr. Arati Baliga, "Understanding Blockchain Consensus Models", Whitepaper, Persistent Systems Ltd., Apr. 2017, pp. 1-13.

* cited by examiner

Block/Block Notarization Request Message (BNRM)

| Block/BNRM |
| --- |
| Sequence Number |
| Blockchain Length |
| Notarization Request |
| TX1... TX2... TX3... TX4... |

Fig. 3A

Second Message/ Heartbeat Message

| Heartbeat Message |
| --- |
| Sequence Number |
| Blockchain Length |
| Notarization Request |
| Hash (e.g., E56X1F40KZ...) |

Fig. 3B

Yell Message

| Yell Message |
| --- |
| TX1... TX2... TX3... TX4... |

Fig. 3C

BLOCKCHAIN CONSENSUS METHODS AND SYSTEMS

CROSS-REFERENCE TO RELATED APPLICATIONS

This application claims the benefit of U.S. Provisional Application 62/633,466, filed Feb. 21, 2018, the entirety of which is herein incorporated by reference.

FIELD OF THE INVENTION

The present application relates to the field of blockchain consensus, and in particular, to blockchain consensus systems and protocols that involve a technique for increasing transaction throughout and expediting transaction confirmation time in some network conditions, and a technique for securing transaction confirmation in some other network conditions.

BACKGROUND OF THE INVENTION

Distributed ledgers provided in peer-to-peer networks, such as the blockchain used in the Bitcoin and Ethereum cryptocurrency systems, rely on a consensus system agreed-upon by the participants on the peer-to-peer network in order to add blocks of data to the ledger. In such systems, participants examine proposed block in order to verify that they conform to a network agreed standard, rather than relying on a third-party trusted central authority to authorize the addition.

Existing consensus systems, however, have several problems. Proof of work systems require solving complex hashing algorithms using enormous, specialized hardware that consumes too much electricity. Such system have led to a hashing hardware arms race and creation of mining pools. Proof of stake systems are aimed to address the problems of proof of work systems. The idea behind proof of stake systems is to make control of the public ledger proportional to ownership stake of the digital currency. It is hoped that proof of stake systems will be more energy efficient and more appropriately distribute control over the public ledger. Such systems, however, can lead to creation of multiple chains or forks and there is no objective way to choose between them (Nothing-at-Stake problem). Practical Byzantine fault tolerance (PBFT) systems are another consensus systems. These systems are implemented through multiple rounds of participant voting, requiring messages in the network to be signed multiple times. This introduces a computational overhead to calculate the signatures and a disk space overhead to store all the multiple signatures generated. Conventional consensus systems also have low throughput because they do not scale well to handle large transaction volumes. For example, Bitcoin and Ethereum can handle no more than 10 transactions per second. In contrast, Visa's transaction processing system can handle more than 200 transactions in the same amount of time. Conventional consensus systems further have slow confirmation time. In Bitcoin and Ethereum, new blocks of transactions are mined approximately every ten minutes and thirteen minutes, respectively. Their slowness hinder many important applications, especially smart contract applications. There are also consensus systems that attempt to solve the above problems. Those consensus systems, however, are restricted to only payments (e.g., do not handle smart contracts), provide security only up $1/3$ of attack (the blockchain can still operate securely if $1/3$ or less of the total miners or validators on the blockchain misbehave), and involve actual transaction data (or substantial amount of actual transaction data) that consumes too much transmission and processing bandwidth of the consensus systems for detecting a fault.

Accordingly, there remains a need for blockchain consensus systems and protocols that are improved over the prior art.

SUMMARY OF THE INVENTION

In accordance with principles of the invention, a system that implements a blockchain consensus protocol is contemplated. In one embodiment, the system comprises a plurality of node computer. Each node computer in the plurality of node computers includes a processor, memory storing computer instructions executable by the processor, and a network interface operatively coupled to the processor and a communications network connecting the plurality of node computers. The plurality of node computers includes a committee of node computers, a collecting node computer, and a plurality of node computers operating based on proof of work algorithms. Each node computer in the plurality of node computers includes a blockchain consensus software application stored in the memory. The application executable by the processor to perform steps comprising generating, by the collecting node computer, an electronic block including one or more electronic transactions, a sequence number, a blockchain length, and a notarization request; transmitting, by the collecting node computer, the electronic blocks to the committee of node computers; and signing, by a number of node computers in the committee, the electronic block. When the electronic block is signed by a supermajority of the node computers in the committee, the system confirms the electronic block including the received transactions to a public ledger.

In another embodiment, the application is executable by the processor to perform steps further comprising determining that one of the electronic transactions is not confirmed on the public ledger, where upon an affirmative determination, transmitting the unconfirmed electronic transaction to the plurality of node computers that operate based on proof of work algorithms and solving the unconfirmed electronic transactions using the proof of work algorithms.

In another embodiment, the application is executable by the processor to perform steps further comprising initiating a transition period and transmitting the unconfirmed electronic transaction to the plurality of node computers hat operate based on proof of work algorithms during the transition period.

In another embodiment, the application is executable by the processor to perform steps further comprising transmitting subsequent electronic transactions to the plurality of node computers that operate based on proof of work algorithms after the transition period expires.

In another embodiment, the transaction is unconfirmed due to that the collecting node computer is offline or cheating. In another embodiment, the transaction is unconfirmed due to that a number of node computers in the committee is offline or cheating.

In another embodiment, a supermajority of the node computers in the committee is at least 75% of the node computers in the committee In another embodiment, the collecting node computer and the committee of node computers are configured to communicate with the plurality of node computers operating based on proof of work algorithms that the collecting node computer and the committee of node computers have been notarizing electronic blocks.

In another embodiment, when the collecting node computer and the committee of node computers stop communicating with the plurality of node computers operating based on proof of work algorithms that the collecting node computer and the committee of node computers have been notarizing electronic blocks, deactivating block confirmation through the collecting node computer and the committee of node computers.

In another embodiment, the application is executable by the processor to perform steps further comprising transmitting subsequent electronic transactions to the plurality of node computers that operate based on proof of work algorithms after the block confirmation through the collecting node computer and the committee of node computers is deactivated.

In accordance with principles of the invention, a system that implements a blockchain consensus protocol is contemplated. In one embodiment, the system comprises a plurality of node computers. Each node computer in the plurality of node computers includes a processor, memory storing computer instructions executable by the processor, and a network interface operatively coupled to the processor and a communications network connecting the plurality of node computers. The plurality of node computers includes a committee of node computers, an collecting node computer, and a plurality of node computers operating based on proof of work algorithms. Each node computer in the plurality of node computers includes a software application stored in the memory. The application is executable by the processor to perform steps comprising updating a public ledger with the electronic transactions via a fast path. This updating step includes signing and notarizing the electronic transactions by a supermajority of the node computers in the committee and outputting the notarized electronic transactions to the public ledger. The steps also comprises alternatively updating the public ledger with the electronic transactions via a slow path. This alternative updating step includes determining that the collecting node computers offline or cheating or that malicious information has been detected from the collecting node computer and subjecting the electronic transactions to a blockchain consensus protocol based on proof of work principles.

In accordance with principles of the invention, a system that implements a two-mode blockchain consensus protocol is contemplated. In one embodiment, the system comprises a plurality of node computers. Each node computer in the plurality of node computers includes a processor, memory storing computer instructions executable by the processor, and a network interface operatively coupled to the processor and a communications network connecting the plurality of node computers. The plurality of node computers includes a committee of node computers, an collecting node computer, and a plurality of node computers operating based on proof of work algorithms. The committee of node computers an collecting node computer form a first blockchain consensus system. The plurality of node computers operating based on proof of work algorithms is a second blockchain consensus system.

Each node computer in the plurality of node computers includes a blockchain consensus software application stored in the memory. The blockchain consensus software application implements the two-mode blockchain consensus protocol. The application is executable by the processor to perform steps comprising generating, by the collecting node computer, an electronic block including one or more electronic transactions, a sequence number, a blockchain length, and a notarization request. The sequence number is a number given to the block by the collecting node computer. The blockchain length is a blockchain length of the blockchain in the second blockchain consensus system and is the blockchain length when the transactions are received or when the block is created. The blockchain length serves as time information or a timestamp. The notarization request includes information or message instructing the committee to sign and notarize the block. The electronic block may be referred to as a block notarization request message.

The collecting node computer can also generate a heartbeat message. The heartbeat message includes information similar to that of the electronic block except that the actual electronic transactions are replaced by a hash representing those transactions.

The collecting node computer then signs the block or both the block and the heartbeat message and transmits the signed block and the heartbeat message (may or may not be signed) to the committee.

The committee members in the committee then signs the block and the heartbeat message. When the block is signed by a supermajority of the node computers in the committee, the block is considered notarized and the system confirms the block including the received transactions to a public ledger. When the heartbeat message is signed by a supermajority of the node computers in the committee, the heartbeat message is considered notarized and the notarized heartbeat message is transmitted to the second blockchain consensus system via the communications network.

When the collecting node is offline or cheating (or when a number of committee members are offline or cheating), the committee is unable to receive or notarize the block and the heartbeat message. As a result, transactions would not be confirmed on the public ledger. A yell message then can be sent to the second blockchain consensus system. The yell message includes transactions that have not yet been confirmed (resending the transactions or unconfirmed transactions to the second blockchain consensus system). By communicating with the second blockchain consensus system, committee members know that they should expect those transactions or the block containing those transactions. If committee members do not receive, sign, or notarize the block after a period of time, then the first blockchain consensus system is deactivated and the system enters a transition period. In the transition period, the system directs all the unconfirmed or pending blocks/transactions since the last heartbeat to the second blockchain consensus system. The pending blocks/transactions are then confirmed through the second blockchain consensus system. The system can re-activate the first blockchain consensus system by the collecting node computer sending a summon message to the second blockchain consensus system and to summon the committee to retry signing and notarizing blocks at a certain point of time.

In some embodiments, the plurality of node computers also includes a first node computer that is configured to generate one or more electronic transactions and send the generated transactions to the collecting node computer for block creation and signature. The first node computer is also configured to generate a yell message containing unconfirmed tractions and send it to the second blockchain consensus system.

Counterpart method and computer-readable medium embodiments would be understood from the above and the overall disclosure. Also, broader, narrower, or different combinations of the described features are contemplated, such that, for example features can be removed or added in a broadening or narrowing way.

BRIEF DESCRIPTION OF THE DRAWINGS

The nature and various advantages of the present invention will become more apparent upon consideration of the following detailed description, taken in conjunction with the accompanying drawings, in which like reference characters refer to like parts throughout, and in which.

DETAILED DESCRIPTION OF THE INVENTION

Figure 1:
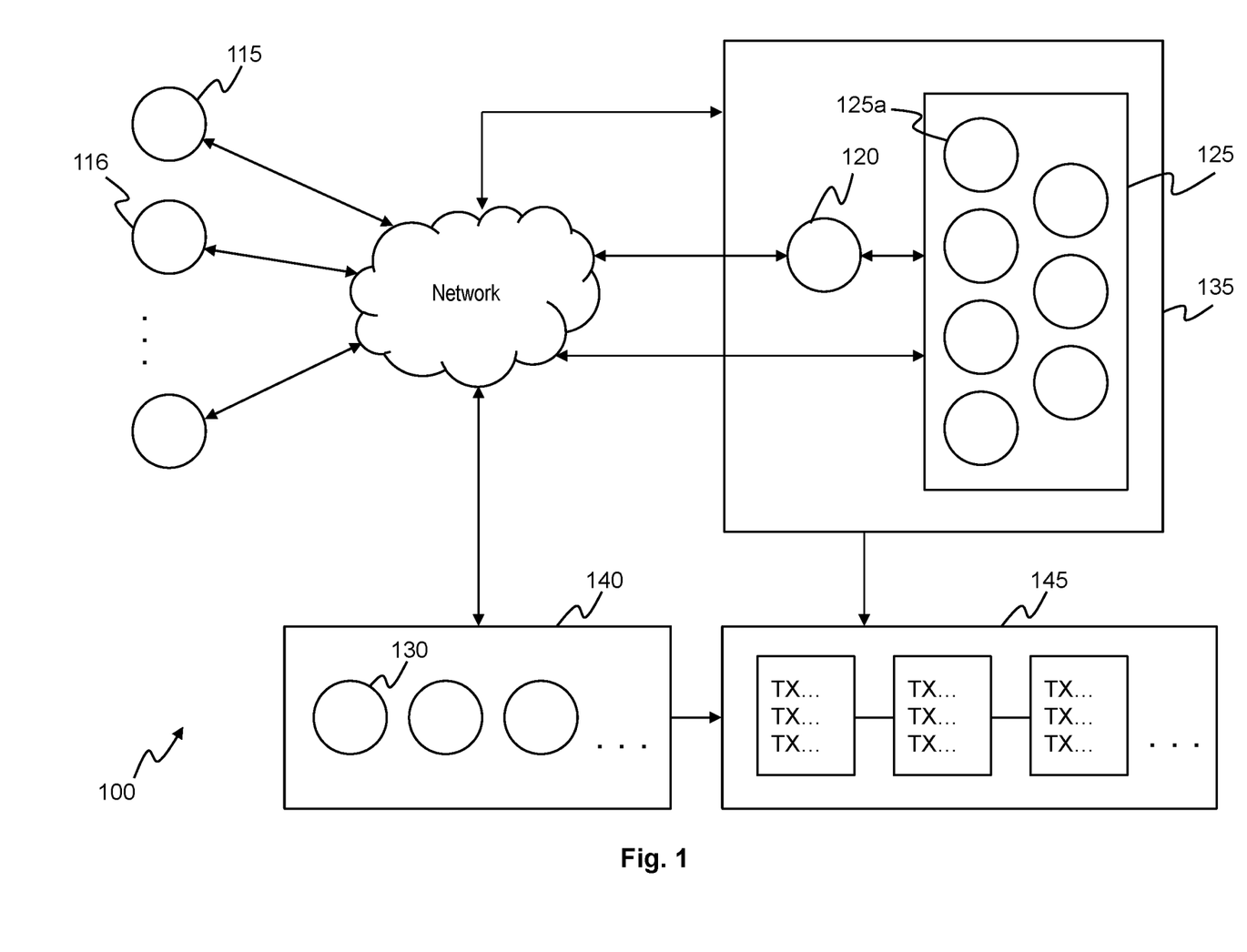
FIG. 1 depicts a system that implements an illustrative two-mode blockchain consensus protocol in accordance with some embodiments of the present invention.
Figure 2:
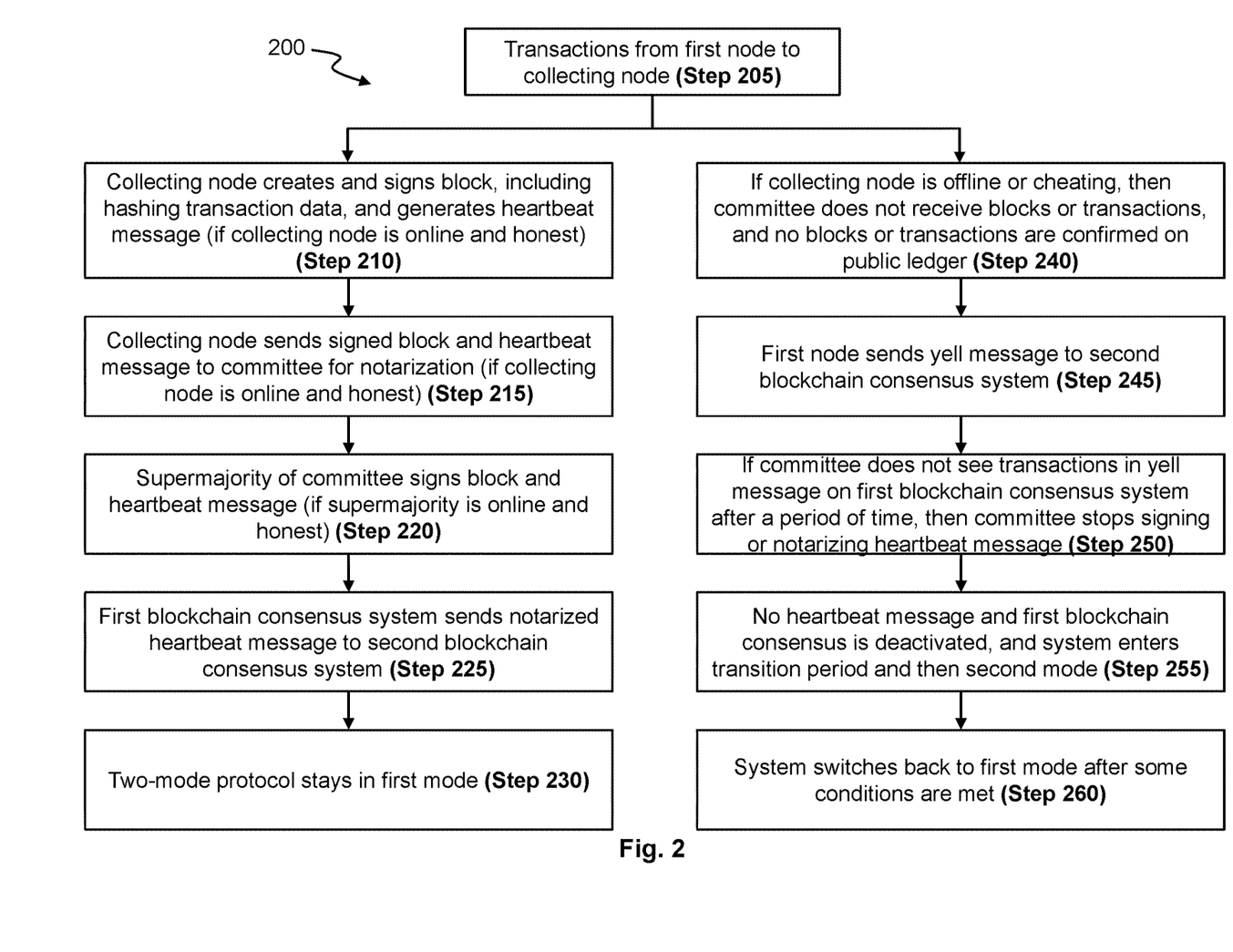
FIG. 2 depicts a flow diagram of the two-mode blockchain consensus protocol in accordance with some embodiments of the present invention.

FIG. 1 depicts a system 100 that implements an illustrative two-mode blockchain consensus protocol described in this application. The system 100 includes a plurality of node computers (115, 1116, 120, 125a, 130) and a communications network 110 connecting the plurality of node computers. The plurality of node computers includes a first node computer 115 (or a participant node computer 115), a collecting node computer 120, a committee of node computers 125, and one or more node computers 130 that operate based on proof of work algorithms. Each node computer in the plurality includes a processor, memory storing computer instructions executable by the processor, and a network interface operatively coupled to the processor and the communications network 110 which may be a wide area network such as the Internet. Each node computer in the plurality includes a blockchain consensus software application running on the processor of the node computer. The blockchain consensus software application is adapted to connect to the plurality of node computers that are connected to the communications network 110. The blockchain consensus software application implements the two-mode blockchain consensus protocol described in this application. Through the software application, the plurality of node computers operate to reach a consensus on adding data to a public ledger 145. A public ledger is a distributed ledger system in which transactions (or record of transactions) made in bitcoin or another cryptocurrency are maintained across several node computers that are linked (and immutable) in a peer-to-peer network. FIG. 2 depicts a flow diagram of the two-mode blockchain consensus protocol 200, or the operation of the system 100. The description below will refer to both figures.

The first node computer 115 can generate one or more electronic transactions and is directed to send the one or more electronic transactions to the collecting node computer 120 over the communications network 110 (step 205). The collecting node computer 120 is selected by the two-mode consensus protocol. The collecting node computer 120 is configured to generate an electronic block including one or more of the received electronic transactions and a sequence number (step 210). Preferably, sequence numbers are marked or signed on electronic blocks in an incremental manner (the sequence number signed on the current block is larger than the sequence number signed on the previous block). In addition to having the electronic transactions and a sequence number, the electronic block also includes information indicating a blockchain length (e.g., current length) of the second blockchain consensus system 140 (described below). The blockchain length may be used as a clock to indicate when a transaction is proposed by the first collecting node 115. The blockchain length is different in each electronic block and it depends on when the electronic block is created. For example, if the blockchain length of the second blockchain consensus system 140 is 10 blocks when a block is generated by the collecting node computer, then that length information is incorporated into the block. For example, if the blockchain length is 15 blocks when the next block is generated, then that length information is incorporated into the next block.

Figure 3A:
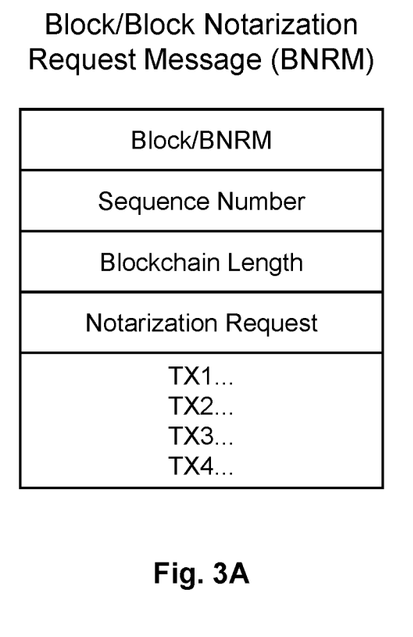
FIGS. 3A-3C depict illustrative electron block (or block notarization request message), heartbeat message, and transaction message (yell message) in accordance with some embodiments of the present invention.

The electronic block further includes a notarization request asking the committee 125 to notarize the block (notarization is described below). As such, in one embodiment, an electronic block includes one or more of the received electronic transactions, a sequence number, a blockchain length (which is time information or a timestamp, described below and a notarization request. An electronic block including all these information may be referred to as a block notarization request message, or sometimes simply electronic block or block. FIG. 3A depicts one embodiment of a block or a block notarization request message. The collecting node computer 120 then signs the block or the block notarization request message.

Figure 3B:
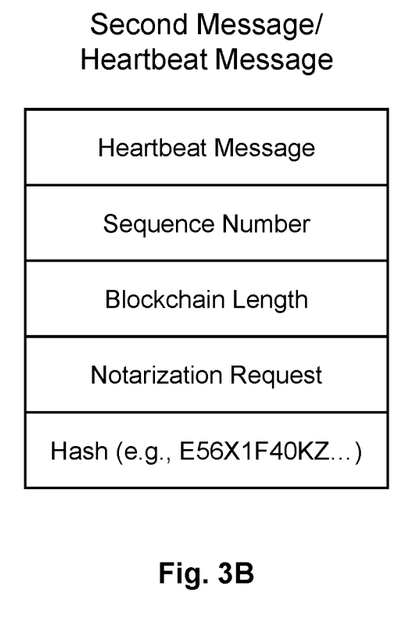

The collecting node computer 120 is also configured to generate a communication notarization request message (sometimes referred to as the second message) (step 210). This message includes the same information as the block notarization request message except that the one or more of the received electronic transactions are replaced by a hash of those transactions. The collecting node computer can perform a hash function on the received electronic transactions and include the obtained hash in the second message. In some embodiments, the hash can be produced based on the one or more of the received electronic transactions, the sequence number, the blockchain length, the notarization request, or combinations thereof. Hash algorithms may include SHA-256, Scrypt, Blake-256, CryptoNight, HEFTY1, SHA-3, scrypt-jane, scrypt-n, or combinations thereof. The second message is devoid of actual transactions (replaced by a hash) and the absence of actual transactions makes the file size of the message is significantly smaller than that of the block notarization request message or the transaction data in that message. FIG. 3B depicts one embodiment of the second message.

Variations of the second message are also contemplated. For example, the second message may be devoid or avoids containing actual transactions that raises security issue. The second message may also include some amount of actual transactions, or a small bit of actual transactions, that does not hinder or significantly hinder the throughput of the system 100.

The collecting node computer 120 then sends the signed electronic block (or the signed block notarization request message) and the second message to the committee of node computers 125 over the communications network 110 (step 215). The collecting node computer 120 can be one node computer or a cluster of distributed node computers. Although the figure and description discuss only one collecting node computer 120, the system may include more than one collecting node computer. Signed electronic block and signed block notarization request message are used interchangeably throughout this disclosure to refer to the same item.

The committee of node computers 125 includes a group of member node computers 125a and the signed electronic block and the second message are sent to each of the member node computers 125a. Each member node member 125a is configured to validate the electronic transactions in the signed electronic block using validation methods based on proof of stake principles. Each member node computer 125a may be referred to as a validator or forger. After validating the transactions, the member node computer 125a signs the electronic block. Each member node computer 125 can only sign a block or a sequenced-numbered block once. One or more of the member node computers 125a, instead of all the member node computers 125a, can validate the transactions and sign the electronic block. When the electronic block receives enough signatures from the committee 125, the electronic block is automatically confirmed or added to the public ledger (step 220). The number of required signatures may be a number that is greater or equal to a supermajority of the member node computers 125a. Preferably, supermajority is greater than or equal to ¾ of the total number of member node computers 125a. A block that has received a supermajority of signatures from the member node computers 125a is considered as notarized. Notarization leads the collecting node computer 120 and the committee 125 to confirm the notarized block and the transactions in the block on the public ledger.

The committee of node computers 125 also signs and notarizes the second message in similar manners (step 220). The notarized second message is then sent to the second blockchain consensus system 140 (step 220).

The member node computers 125a in the committee can be selected by several methods. One method is by selecting a number of most recent miners (or miner node computers) from the one or snore node computers 130 that operate based on proof of work algorithms, or other node computers and blockchain systems that operate based on proof of work algorithms. Most recent miners refer to miners of the most recent mined blocks. Another method is by subsampling from all the stake-holders or the most recent stake-holders. Yet another method is by selecting from stake holders who have put down stake or cryptocurrency in an escrow. The selection can be random from this pool of stake holders or be implemented with preferences given to stake holders who have put down the most stake in the escrow.

A stake holder is a node computer that is selected by and operates based on proof of stake algorithms. A node computer is selected based on how much of stake or cryptocurrency they have, e.g., the proof of stake protocol will randomly assign the right to validate between node computers based upon the value of their stakes, or in some cases, how long they have been holding the cryptocurrency. In other words, the probability of being selected as a stake holder for validating transactions is proportional to that user or node computer's holding of the token or cryptocurrency in the escrow. To qualify as a candidate for being selected for transaction validation, a node computer first would need to put down a stake or cryptocurrency in an escrow.

Preferably, the first node computer 115 (and other node computers 116) is directed to always send electronic transactions to the collecting node computer 120 so that the collecting node computer can initiate a process that can quickly confirm electronic blocks and transactions. This procedure may be executed by assuming or actually determining that the collecting node computer 120 is online and honest, that a supermajority of the member node computers 125a is online and honest, that the slow-chain (system 140) is secure, or combinations thereof. The collecting node computer 120 and the committee 125 then perform their respective functions to add the block of transactions to the distributed ledger system. The collecting node computer 120 and the committee 125 allow the system 100 to process a large volume of transactions, on the order of 1000-2000 transactions per second, and confirm or add blocks of transactions to the distributed ledger system instantly, such as in 0.5 to 1 second. The first node computer 115 (or the first blockchain consensus system 135) can directly output its longest sequence of consecutive notarized blocks (determined by the collecting node computer signed sequence number) to the distributed ledger system and all the transactions in the notarized blocks are instantly confirmed. For example, the first node computer 115 may send two transactions to the collecting node computer 120 and the committee 125 that the collecting node computer 120 and the committee 125 can bundle up with other transactions from other node computers to create a block and notarize the block. The first node computer 115 then may send three more transactions to the collecting node computer 120 and the committee 125 that the collecting node computer 120 and the committee 125 can bundle up with other additional transactions from other node computers to create another block and notarize the other block. The collecting node computer 120 and the committee 125 can then add both notarized blocks to the distributed ledger system and all the transactions in both blocks are instantly confirmed (e.g., in 0.5 to 1 second).

In some embodiments, the notarization method of an electronic block can be implemented in a different manner. A committee member 125a may agree to sign a block only if it knows that the block immediately before the current block has been notarized. As such, in order to notarize a block, a supermajority (e.g., ¾) of the committee members 125a would need to know that the block immediately before the current block has been notarized and the supermajority of the committee members 125a would need to sign the current block. In this situation, instead outputting the longest sequence of consecutive notarized blocks to the distributed ledger system, the first node computer 115 (or the first blockchain consensus system 135) outputs the longest sequence of consecutive notarized blocks minus the last block to the distributed ledger system 145. For example, if the maximum length of consecutive notarized blocks is 130 blocks, then only the first 129 blocks are confirmed. The last block or the 130$^{th}$ block is excluded. Current block refers to a block that a committee member is about to sign.

In some embodiments, a committee member 125a may agree to sign a block only if it knows that a block before the current block has been notarized. This block can be a block that are two or more blocks before the current block. A committee member 125a may agree to sign a block only if it knows that X blocks before the current block has been notarized. For example, in order to sign the current block 150, the committee member 125a would need to know that the 145$^{th}$ block has been notarized. Similarly, a supermajority (e.g., ¾) of the committee members 125a would. need to know that the 145$^{th}$ block has been notarized and the supermajority of the committee members 125a would need to sign the current block in order to have the current block notarized. In this situation, instead outputting the longest sequence of consecutive notarized blocks to the distributed ledger system, the first node computer 115 (or the first blockchain consensus system 135) outputs the longest sequence of consecutive notarized blocks minus the two or more blocks to the distributed ledger system. For instance, in the above example, only the first 145 blocks are confirmed (150 blocks minus 5 blocks) and the last 5 blocks are excluded.

Requiring a committee member to know that a block before or immediately before the current block has been notarized allows the first blockchain consensus system to be partition tolerant. This feature allows all the committee members to have the same or consistent view of the public ledger 145 if one or more of the committee members are disconnected from the communications network and then are reconnected to the public ledger.

The operation involving the collecting node computer 120 and the committee 125 may be referred to as the first or fast blockchain consensus protocol. A combination that includes the collecting node computer 120 and the committee 125 may be referred to as the first or fast blockchain consensus system 135 (or as the first or fast chain). This mode of operation only requires two rounds of communication confirm a block of transactions, one round from the collecting node computer 120 to the committee 125 and another round from the committee 125 reporting acknowledgment or that a block has been signed by a committee member 125a. The terms "confirm" and "add" are synonymous and are used interchangeably in this disclosure. For example, a block/transaction has been confirmed means that the block/transaction has been added or outputted to the distributed ledger system or is available on the distributed ledger system to other node computers on the distributed ledger system.

With the respect to the collecting node computer 120, online means that the collecting node computer 120 is capable of receiving electronics transactions from the first node 115, creating a block containing the received transactions, signing the block, and transmitting the signed block to the committee. Offline means that the collecting node computer 120 is unable to receive electronics transactions or is disconnected from the first node computer 115, the committee 125, and/or the communications network 110. Honesty means that the collecting node computer 120 is performing what it is required to perform (e.g., executing the creating, signing, and transmitting steps) and that the received transactions, the block, and sequence number are not manipulated by the collecting node computer 120 to add incorrect transaction data to the distributed ledger system. Transaction data refers to data of an electronic transaction which may include, for example, the identity of the first node in hash and the transaction data. Dishonesty or cheating means that the collecting node computer 120 is violating or is attempting to violate one or more of the above honesty requirements (malicious activities, or malicious information generated in response to the malicious activities).

With respect to the member node computer 125a, online means that a member node computer is capable of receiving signed blocks from the collecting node computer 120, validating the transactions in the received blocks, and signing the received blocks after the validation. Offline means that a member node computer is unable to receive signed blocks from the collecting node computer 120 or is disconnected from the collecting node computer 120 and/or the communications network 110. Honesty means that a member node computer is performing what it is required to perform (e.g., executing the validating and signing steps) and that the transactions in the received blocks and the signatures by the collecting node computer and the member node computer are not manipulated by the member node computer to add incorrect transaction data to the distributed ledger system. Dishonesty or cheating means that a member node computer is violating or is attempting to violate one or more of the above honesty requirements (malicious activities, or malicious information generated in response to the malicious activities).

The first blockchain consensus system 135 is configured to communicate with the one or more node computers 130 that operate based on proof of work algorithms via the communications network 110. The one or more node computers 130 that operate based on proof of work algorithm may be referred to as the second or slow blockchain consensus system 140 (or as the second or slow chain). The operation of the one or more node computers 130 may be referred to as the second or slow blockchain consensus protocol. The second blockchain consensus system 140 operates with a confirmation time that is slower than that of the first blockchain consensus system 135. Confirmation time refers to the speed of a consensus system to confirm or add a block/transactions to the distributed ledger system. For example, the second blockchain consensus system 140 has an average confirmation time of approximately 10-13 minutes for confirming a block. The first blockchain consensus system 135 is configured to generate and send a communication notarization request message (second message) to the second blockchain consensus system 140. The first blockchain consensus system 135 may generate the second message at the same time when the electronic block or the block notarization request message is generated.

The second message, for example, may be a heartbeat type of message (heartbeat message). The second message is a heartbeat message in that it is configured to be generated and sent to the second blockchain consensus system 140 periodically that resembles heartbeat. Each second message generated and sent by first blockchain consensus system 135 (or received by the second blockchain consensus system 140) is similar to a pulsation of the heart. Like a heartbeat, a second message is guaranteed to be generated and sent on a regular basis unless the first blockchain consensus system 135 goes wrong (e.g., the collecting node computer and/or a committee member is offline or cheating). A heartbeat message may be a message that is generated by the collecting node computer 120 that includes a hash representing transactions in the block (produced by the collecting node computer), a sequence number (signed by the collecting node computer), a blockchain length (e.g., current length) of the second blockchain consensus system 140, and a request to be notarized by the committee 125. The blockchain length is different in each heartbeat message and it depends on when the heartbeat message is generated. For example, if the blockchain length is 10 blocks when a heartbeat message is generated, then that length is incorporated into the heartbeat message. For example, if the blockchain length is 15 blocks when the next heartbeat message is generated, then that length is incorporated into the next heartbeat message. The blockchain length information serves as a timestamp indicating when a heartbeat message is generated. In some embodiments, the hash can be produced based on the one or more of the transactions in the block, the sequence number, the length or time information, the notarization request, or combinations thereof. FIG. 3B depicts one embodiment of the heartbeat message.

The heartbeat message is devoid of actual transactions or actual transaction data (replaced by a hash) and the absence of actual transactions makes the file size of the message is significantly smaller than that of the electronic block, the block notarization request message, or the transaction data in the block or message. The small file size, or the transmission of small file size heartbeat messages, creates more transmission and processing bandwidth for the system 100 which can be used by the system 100 to handle additional transactions from the first and other computer nodes 115, 116 and thus allows the system 100 to have high throughout (can handle a larger number of transactions in a second compared to conventional consensus system. The heartbeat message is sent to the committee 125 along with the block or the block notarization request message so that the heartbeat message can also get notarized. The heartbeat message may be a tuple or be made of a tuple.

Variations of the heartbeat message are also contemplated. For example, the heartbeat message may be devoid or avoids containing actual transactions that raises security issue. The heartbeat message may also include some amount of actual transactions, or a small bit of actual transactions, that does not hinder or significantly hinder the throughput of the system 100.

Upon receipt of the heartbeat message, the committee 125 checks if the hash in the heartbeat message is correct and signs on the heartbeat message only if the hash is correct. After the heartbeat message receives enough signatures (e.g., from a supermajority of the member node computers 125*a*), which are received at approximately the same time when the block receives the signatures, the heartbeat message is considered as notarized. The notarized message is the message that the first blockchain consensus system 135 sends to the second blockchain consensus system 140. The continuous or periodic transmission of the notarized message resembles pulsations of the heart. Other types of messages or forms of communications for conveying the notarized message are also contemplated.

The system 100 (or the blockchain consensus software application) can detect dishonesty, cheating, and malicious activities or information from the first blockchain consensus system 135 and make an affirmative determination by using the heartbeat message, e.g., when the second blockchain consensus system 40 does not receive a notarized heartbeat message for a period of time.

Figure 3C:
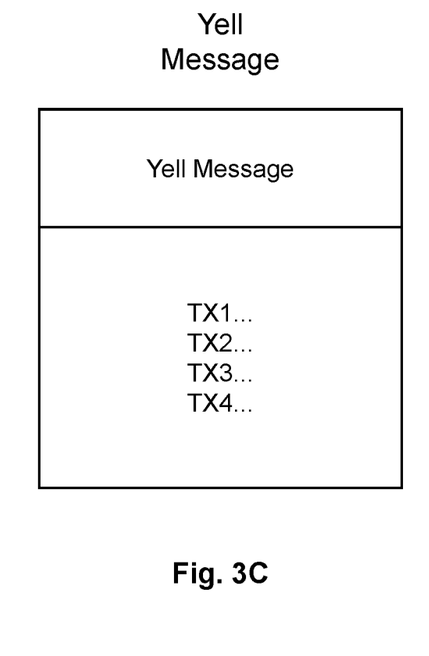

If the committee 125 does not notarize a heartbeat message or if more than ¼ of the committee members 125*a* does not sign a heartbeat message, then the first blockchain consensus system 135 does not send a heartbeat message to the second blockchain consensus system 140. The absence of heartbeat message may be due to that the collecting node computer is offline or cheating, that an insufficient number of member node computers are online or honest less than a supermajority of the committee members), or combination thereof. These conditions can be discovered when the first node computer 115 or its user notices that its electronic transactions are not confirmed on the distributed ledger system 145 after a period of time (step 240). When the first node computer 105 notices this issue, the first node computer 115 can send a transaction message (yell message) including transactions that have not been confirmed by the first blockchain consensus system 135 to the second blockchain consensus system 140 (step 245). The transaction message may also include information communicating to a committee member that the committee member should expect signing the block or message including the same transactions. FIG. 3C depicts one embodiment of the yell message. The committee member 125*a* can see the transaction message (and its content) on the second blockchain consensus system 140 by way of communication between the first blockchain consensus system 135 and the second blockchain consensus system 140.

If the committee member 125 does not receive or sign the block or message including the same transactions after a period of time, or notices that the block or message including the same transactions is not notarized after a period of time, the committee member 125*a* knows that the collecting node computer 120 or more than ¼ of the committee members are cheating or offline. At this point and going forward, the committee member 125*a* and other committee members will stop signing heartbeat messages (step 250). Without "heartbeat" or heartbeat messages, the first blockchain consensus system 135 "dies" or is deactivated (step 255).

The blockchain consensus software application then initiates a transition period (which may also be known as a cool-down period or a delay process) after which subsequent or new blocks transactions are sent to and confirmed through the second blockchain consensus system 140 (step 255). The blockchain consensus software application can initiate the transition period after a period that the second blockchain consensus system 140 does not receive any heartbeat message (silence period). The silence period is determined by the blockchain consensus software application to a period during which at least one heartbeat message would be received by the second blockchain consensus system 140.

In the transition period, all the committee members are instructed by the blockchain consensus software application to stop signing electronic blocks and heartbeat messages received from the collecting node computer 120. The transition period provides a duration of time that allows the blockchain consensus software application to direct any pending or unconfirmed electronic blocks and transactions to the second blockchain consensus system 40. The pending electronic blocks and transactions can also be determined by the last heartbeat message received by the second blockchain consensus system 140. All the received and unconfirmed electronic blocks and transactions on the first blockchain consensus system 135 since the last heartbeat message are directed to the second blockchain consensus system 140.

Pending electronic blocks and transactions, for example, may include transactions already sent to the collecting node computer 120 but are not yet received by the collecting node computer 120, transactions at the collecting node computer 120 but are not yet signed by the collecting node computer 120, blocks at the collecting node computer 120 but are not yet sent to the committee 125 (may be signed blocks or blocks that are not yet signed), blocks sent to the committee 125 but are not yet received by the committee 125, blocks at the committee members but are not yet validated or are being validated but validation is not yet completed, blocks that have been notarized but have not yet been added to the distributed ledger system, or combinations thereof.

The duration should be long enough for directing the all the pending blocks and transactions to the second blockchain consensus system 140. In some embodiments, the duration may be long enough allowing the second blockchain consensus system 140 to confirm all the pending blocks and transactions directed to it, in addition to being long enough to directing all the pending blocks and transactions to the second blockchain consensus system 140. Allowing the second blockchain consensus system 140 to finish confirming pending blocks and transactions enable all the node computers and their users to have consistent view of the distributed ledger system and its data, before falling back or switching to the second mode (discussed below). In one embodiment, the duration can be determined by the number of blocks in the second blockchain consensus system 140.

After the transition period ends, the system 100 (or the blockchain consensus software application) enters a second or slow mode where electronic transactions only get confirmed in the second blockchain consensus system 140 (step 255). Before the transition period, the system 100 is considered as operating in the first or fast mode. In the second mode, electronic transactions from the first node computer 115 (and other node computers 116) are sent to the second blockchain consensus system 140 for electronic block creation and confirmation. Each committee member 125*a* also ignores all blocks and messages from the collecting node computer 120. Block creation and confirmation is performed by the second blockchain consensus system 140 until the system 100 reboots or switches to the first mode. Each node computer 130 in the second blockchain consensus system 140 may be referred to as a miner that mines blocks of electronic transactions for addition to the public ledger 145 according to proof of work principles. The first blockchain consensus system 135 and the second blockchain consensus system 140 are configured to add electronic blocks to the same distributed ledger system 140.

If the first blockchain consensus system 135 continuously notarizes electronic blocks or heartbeat messages, then the system 100 stays in the first mode and does not enter the second mode (step 230). The system 00 enters the transition period and then the second mode if the second. blockchain consensus system 140 does not receive a heartbeat message. The conditions that cause the first blockchain consensus system 135 not to generate a heartbeat message may include that the collecting node computer is offline or cheating or that an insufficient number of member node computers are online or honest (e.g., less than a supermajority of the committee members). In some embodiments, entering the second mode may further require the blockchain consensus software application determining that the second blockchain consensus system 140 is secure and that a majority of the committee members 125*a* are honest, in addition to experiencing one of the aforementioned conditions.

The system 100 operates in the second mode until it reboots or switches back to the first mode (step 260). In one embodiment, the system 100 can return to the first mode by determining that the offline or cheating collecting node computer 120 (the faulty collecting node computer) is online or honest once again, instructing the collecting node computer 120 (the obedient collecting node computer, or after the faulty collecting node computer is back online or stops cheating) to send a summon message to the second blockchain consensus system 140 that orders the second. blockchain consensus system 140 to summon committee members (which can be previous committee members 125*a*, new committee members, or combination thereof). The summoned committee members, or the summoned committee members and the obedient collecting node computer, then operate collectively to sign and notarize electronic blocks and heartbeat messages in similar manners as described earlier. In other words, the first mode is re-activated and block confirmation is performed through the first blockchain consensus system 135 again (e.g., the system 100 is operating in the first mode, then the second mode, and then back to the first mode). When the system 100 is back to the first mode, electronic transactions from the first node computer 115 and other node computers 116 is directed to the collecting node computer 120 again.

In some embodiments, the system 100 may instruct the summoned committee members and the obedient collecting node computer to immediately operate in the first mode after committee members are summoned. In some embodiments, the system 100 may re-initiate the first mode at a certain point of time in the future after receipt of the summon message or committee members are summoned. The system 100 can rely on the second blockchain consensus system 140 to determine exactly when (and how) to re-initiate the first mode and select the collecting node computer and committee members. The system 100 can find a different collecting node computer for the to-be-initiated first mode. The system 100 can automatically switch between the first mode and the second mode back and forth depending on the conditions of the collecting node computer and committee members or other factors (e.g., first mode, second mode, first mode, second mode, first mode, and so forth). Preferably, the system 100 is configured to operate based on the first blockchain consensus system 135 if possible, and to fall back to the operation based on the second blockchain consensus system 140 only if some conditions are met.

The system 100 based on the first blockchain consensus system 135 and the second. blockchain consensus system 140 allows the system 100 to defend up to a 50% blockchain attack (e.g., a group of miners controlling more than 50% of the network's mining hashrate, a validator controlling 50% of the cryptocurrency on the network, or combination thereof). Conventional systems such as PBFT is implemented on different concepts that only allows up to ⅓ of blockchain attack, rather than on proof of work and proof of stake principles that are robust to a 50% blockchain attack.

Therefore, based on the above description, in one embodiment the blockchain consensus software application essentially implements a blockchain consensus protocol that involves the collecting node computer and the committee of node computers (e.g., the first blockchain consensus system 135) and a blockchain consensus protocol that involves proof of work algorithms (e.g., the second blockchain consensus system 140). In one embodiment, the blockchain consensus software application can implement only the blockchain consensus protocol that involves the collecting node computer and the committee of node computers. In this embodiment, the blockchain consensus software application may be configured to be integrated with or perform as an overlay system on conventional blockchain consensus systems that operate based on proof of work principles or other consensus protocols, such as Bitcoin and Ethereum cryptocurrency platforms, to increase their throughput and expedite their block confirmation time.

Protocols and algorithms described in this application are implemented on computers or node computers that are connected by a communications network. The communications network can include the Internet, a cellular network, a telephone network, a computer network, a packet switching network, a wide area network (WAN), a global area network, or other network. Each of the node computers includes a processor, memory storing computer instructions executable by the processor, and a network interface operatively coupled to the processor. The network interface is configured to support the communications network, allowing one node computer to receive data from and transmit data to another node computer. A node computer can be a desktop computer, laptop computer, a mobile computer, a tablet computer, a cellular device, a smartphone, a personal digital assistant (PDA), or any other computing devices having a microprocessor and memory.

Embodiments of the present invention are directed to systems, devices, and methods that perform the protocols and algorithms.

Embodiments of the present invention are also related to a non-transient computer readable medium configured to carry out any one of the methods disclosed herein. The protocols and algorithms can be a set of computer instructions readable by a processor and stored on the non-transient computer readable medium. Such medium may be permanent or semi-permanent memory such as hard drive, floppy drive, optical disk, flash memory, ROM, EPROM, EEPROM, etc., as would be known to those of ordinary skill in the art.

An Accelerator or accelerator node computer may also be known as a leader or leader node computer. An Accelerator or accelerator node computer is a species of a collecting node computer that is configured to receive electronic transactions generated by one or more participant node computers (e.g., the first node computer is one of the participant node computers), generate at least one electronic block including one or more of the received electronic transactions, mark each electronic block with a sequence number, and transmit the marked electronic blocks to the committee of node computers. A collecting node computer can be determined or assigned by the described system, protocol, users of the system, or a combination thereof. There may be more than one collecting node computer. A collecting node computer may be online, offline, cheating, or conducting malicious activities. Blocks created, transmitted, or notarized in the first mode may be referred to as micro-blocks.

A transaction is a transfer of Bitcoin value or other cryptocurrency value that is broadcasted to a network or a peer-to-peer network and collected into electronic blocks. Transactions are typically economic (e.g., financial transactions) but it can be other kind of information. "TX . . . " in the figures represents a transaction.

A blockchain is a sequence of blocks or groups of transactions made in bitcoin or other cryptocurrency that are linked together and distributed among node computers in a peer-to-peer network. The public ledger or distributed ledger system described in this application is implemented using blockchain. Blocks in the blockchain or public ledger includes the hash value of previous block, making the blockchain or ledger immutable. A hash is a cryptographic function that transforms any input data into a fixed-length string of numbers. The obtained fixed-length string of numbers is a hash value. For example, a hash value of a block is obtained by cryptographically transforming (hashing) the transactions in the block and the hash value of the previous block. Each block may include the hash value of the previous block, one or more transactions, and the hash value of the current block that is obtained by using the previous block's hash value and one or more transactions.

Validation in the first blockchain consensus protocol system (e.g., by the committee) refers to a process for verifying that blocks were transmitted by the collecting node computer (not by other node computers) and the transactions in the blocks are legitimate (not malicious, double spends etc). The node computer or user selected for performing this process depends on how much of stake or cryptocurrency it has put down in an escrow. This node computer or user is one that has put down a stake or cryptocurrency in the escrow.

Validation or mining in the second blockchain consensus protocol system refers to a process for producing a hash value that is less than a threshold value determined by the second blockchain consensus protocol system. In one embodiment, this hash value (the hash value that is less than the threshold value) obtained by continuously hashing the hash value of the current block and a nonce until the resulting hash value begins with a certain number of 0s. For example, the hash value of the current block is d22z93-ef6 . . . and successful validation or mining would require this value to be 000000d22z93ef6 . . . . Nonce is a small amount of data that is continuously provided and changed by the second blockchain consensus protocol system until the desired hash value is produced.

The term "sign" or "signature" by the collecting node computer refers to a digital signature created by the collecting node computer proving that the collecting node computer is the creator of the block. For example, a digital signature can be created by hashing the transactions to obtain a hash value and encrypting the obtained hash value using a private key of the collecting node computer(generated by a key generation algorithm providing a private and public key). The encrypted hash value is the digital signature. The digital signature and the public key are transmitted with the block to the committee.

After a committee member receives the block, the digital signature, and the public key, the committee member decrypts the digital signature using the public key. The committee member also hashes the transactions in the block using the same hash algorithms employed by the collecting node computer. If the hash value from the decryption of the digital signature and the hash value from the hash algorithms are the same, then the committee member knows that the block/transactions have not been altered in transit and verify that the collecting node computer is the creator/transmitter. The committee member can then sign the block in similar manners described above with respect to the collecting node computer.

Validation in the first blockchain consensus protocol system may also refer to that the committee member knows that the block/transactions have not been altered in transit and verify that the collecting node computer is the creator/transmitter.

The system described in this application (e.g., system 100) includes a cryptographic hash, an immutable public ledger, a peer-to-peer network, a consensus protocol (i.e., the two-mode consensus protocol), and a block validation or mining process.

The worse-case conditions, or the conditions required to operate in he second mode, may include that a majority (e.g., preferably greater than 50%) of the committee is online and honest and that the second blockchain consensus system is secure. The majority, for example, may be that 55% or 60% of the total node computers in the committee is honest. Other percentages and conditions are also contemplated.

The optimistic-case conditions, or the conditions required to operate in the first mode, may include that a supermajority (e.g., preferably at least 75%) of the committee is online and honest, that the collecting node computer is online and honest, and that the second blockchain consensus system is secure. The supermajority, for example, may be that 75% or 80% of the committee members is online and honest. Other percentages and conditions are also contemplated.

The above illustrative percentages can mean approximate percentages as well as exact percentages. The term approximate or about means ±5% of the illustrative percentages. For example, approximate or about 5% means between and including 45% and 55% for majority, and between and including 70% and 80% for supermajority.

It will readily be understood by one having ordinary skill in the relevant art that the present invention has broad utility and application. Other embodiments may be discussed for additional illustrative purposes in providing a full and enabling disclosure of the present invention. Moreover many embodiments such as adaptations, variations, modifications, and equivalent arrangements will be implicitly disclosed by the embodiments described herein and fall within the scope of the present invention.

Accordingly, while the embodiments of the present invention are described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended nor is to be construed to limit the scope of patent protection afforded by the present invention, which scope is to be defined by the claims and the equivalents thereof. It is not intended that the scope of patent protection afforded the present invention be defined by reading into any claim a limitation found herein that does not explicitly appear in the claim itself.

Thus for example any sequence(s) and/or temporal order of steps of various processes or methods (or sequence of system connections or operation) that are described herein are illustrative and should not be interpreted as being restrictive. Accordingly, it should be understood that although steps of various processes or methods (or connections or sequence of operations) may be shown and described as being in a sequence or temporal order, but they are not necessary limited to being carried out in any particular sequence or order. For example, the steps in such processes or methods generally may be carried out in various different sequences and orders, while still falling within the scope of the present invention. In addition systems or features described herein are understood to include variations in which features are removed, reordered, or combined in a different way.

Additionally it is important to note that each term used herein refers to that which the ordinary artisan would understand such term to mean based on the contextual use of such term herein. It would be understood that terms that have component modifiers are intended to communicate the modifier as a qualifier characterizing the element, step, system, or component under discussion.

The words "may" and "can" are used in the present description to indicate that this is one embodiment but the description should not be understood to be the only embodiment.

Although the present invention has been described and illustrated herein with referred to preferred embodiments, it will be apparent to those of ordinary skill in the art that other embodiments may perform similar functions and/or achieve like results. Thus it should be understood that various features and aspects of the disclosed embodiments can be combined with or substituted for one another in order to form varying modes of the disclosed invention.

The invention claimed is:

1. A system comprising:
a plurality of node computers, each node computer in the plurality of node computers including a processor, memory storing computer instructions executable by the processor, and a network interface operatively coupled to the processor and a communications network connecting the plurality of node computers, wherein the plurality of node computers includes a committee of node computers, a collecting node computer, and a plurality of node computers operating based on proof of work algorithms; wherein
each node computer in the plurality of node computers includes a blockchain consensus software application stored in the memory, wherein the application is executable by the processor to perform steps comprising:
generating, by the collecting node computer, an electronic block including one or more electronic transactions, a sequence number, a blockchain length, and a notarization request;
transmitting, by the collecting node computer, the electronic blocks to the committee of node computers; and
signing, by a number of node computers in the committee, the electronic block,
wherein when the electronic block is signed by a supermajority of the node computers in the committee, confirming the electronic block including the received transactions to a public ledger,
wherein the collecting node computer and the committee of node computers are configured to communicate with the plurality of node computers operating based on proof of work algorithms that the collecting node computer and the committee of node computers have been notarizing electronic blocks, and when the collecting node computer and the committee of node computers stop communicating with the plurality of node computers operating based on proof of work algorithms that the collecting node computer and the committee of node computers have been notarizing electronic blocks, deactivate block confirmation through the collecting node computer and the committee of node computers, and
wherein the application is executable by the processor to perform steps further comprising:
transmitting subsequent electronic transactions to the plurality of node computers that operate based on proof of work algorithms after the block confirmation through the collecting node computer and the committee of node computers is deactivated.

2. The system according to claim 1, wherein the application is executable by the processor to perform steps further comprising:
determining that one of the electronic transactions is not confirmed on the public ledger, where upon an affirmative determination, transmitting the unconfirmed electronic transaction to the plurality of node computers that operate based on proof of work algorithms and solving the unconfirmed electronic transactions using the proof of work algorithms.

3. The system according to claim 2, wherein the application is executable by the processor to perform steps further comprising:
initiating a transition period and transmitting the unconfirmed electronic transaction to the plurality of node computers that operate based on proof of work algorithms during the transition period.

4. The system according to claim 3, wherein the application is executable by the processor to perform steps further comprising:
transmitting subsequent electronic transactions to the plurality of node computers that operate based on proof of work algorithms after the transition period expires.

5. The system according to claim 2, wherein the transaction is unconfirmed due to that the collecting node computer is offline or cheating.

6. The system according to claim 2, wherein the transaction is unconfirmed due to that a number of node computers in the committee is offline or cheating.

7. The system according to claim 1, wherein a supermajority of the node computers in the committee is at least 75% of the node computers in the committee.

8. A method comprising:
implementing a blockchain consensus software application in a plurality of node computers, wherein the plurality of node computers includes a committee of node computers, a collecting node computer, and a plurality of node computers operating based on proof of work algorithms, each node computer in the plurality of node computers includes a processor, memory storing computer instructions executable by the processor, and a network interface operatively coupled to the processor and a communications network connecting the plurality of node computers, and the instructions executable by the processor to perform steps comprising:
generating, by the collecting node computer, an electronic block including one or more electronic transactions, a sequence number, a blockchain length, and a notarization request;
transmitting, by the collecting node computer, the electronic blocks to the committee of node computers; and
signing, by a number of node computers in the committee, the electronic block,
wherein when the electronic block is signed by a supermajority of the node computers in the committee, confirming the electronic block including the received transactions to a public ledger, and where the steps further comprising,
communicating with the plurality of node computers operating based on proof of work algorithms that the collecting node computer and the committee of node computers have been notarizing electronic blocks,
when the step of communicating with the plurality of node computers operating based on proof of work algorithms stops, deactivating block confirmation through the collecting node computer and the committee of node computers, and
transmitting subsequent electronic transactions to the plurality of node computers that operate based on proof of work algorithms after the step of deactivating block confirmation through the collecting node computer and the committee of node computers.

9. The method according to claim 8, wherein the instructions are executable by the processor to perform steps further comprising:
determining that one of the electronic transactions is not confirmed on the public ledger, where upon an affirmative determination, transmitting the unconfirmed electronic transaction to the plurality of node computers that operate based on proof of work algorithms and solving the unconfirmed electronic transactions using the proof of work algorithms.

10. The method according to claim 9, wherein the instructions are executable by the processor to perform steps further comprising:
initiating a transition period and transmitting the unconfirmed electronic transaction to the plurality of node computers that operate based on proof of work algorithms during the transition period.

11. The method according to claim 10, wherein the instructions are executable by the processor to perform steps further comprising:
transmitting subsequent electronic transactions to the plurality of node computers that operate based on proof of work algorithms after the transition period expires.

12. The method according to claim 8, wherein the transaction is unconfirmed due to that the collecting node computer is offline or cheating.

13. The method according to claim 8, wherein the transaction is unconfirmed due to that a number of node computers in the committee is offline or cheating.

14. The method according to claim 8, wherein a supermajority of the node computers in the committee is at least 75% of the node computers in the committee.

15. A non-transitory computer readable medium storing an application causing a computer to execute a process, the process comprising:
implementing a blockchain consensus software application in a plurality of node computers, wherein the plurality of node computers includes a committee of node computers, a collecting node computer, and a plurality of node computers operating based on proof of work algorithms, each node computer in the plurality of node computers includes a processor, memory storing computer instructions executable by the processor, and a network interface operatively coupled to the processor and a communications network connecting the plurality of node computers, and the instructions executable by the processor to perform steps comprising:
generating, by the collecting node computer, an electronic block including one or more electronic transactions, a sequence number, a blockchain length, and a notarization request;
transmitting, by the collecting node computer, the electronic blocks to the committee of node computers; and
signing, by a number of node computers in the committee, the electronic block,
wherein when the electronic block is signed by a supermajority of the node computers in the committee, confirming the electronic block including the received transactions to a public ledger,
wherein the process further comprising, the collecting node computer and the committee of node computers communicating with the plurality of node computers operating based on proof of work algorithms that the collecting node computer and the committee of node computers have been notarizing electronic blocks, and when the collecting node computer and the committee of node computers stop communicating with the plurality of node computers operating based on proof of work algorithms that the collecting node computer and the committee of node computers have been notarizing electronic blocks, deactivating block confirmation through the collecting node computer and the committee of node computers, and
transmitting subsequent electronic transactions to the plurality of node computers that operate based on proof of work algorithms after the block confirmation through the collecting node computer and the committee of node computers is deactivated.

* * * * *